US011047585B2

(12) United States Patent
Petersen et al.

(10) Patent No.: US 11,047,585 B2
(45) Date of Patent: Jun. 29, 2021

(54) PORTABLE AIR COOLER AND MEDIA PAD APPARATUS FOR USE THEREWITH

(71) Applicant: FKA Distributing Co., LLC, Commerce Township, MI (US)

(72) Inventors: Christopher Michael Petersen, Commerce Township, MI (US); Yigal Offir, Birmingham, MI (US); Lori Scooros, Macomb, MI (US); Herb Conroy, West Bloomfield, MI (US)

(73) Assignee: FKA Distributing Co., LLC, Commerce Township, MI (US)

( * ) Notice: Subject to any disclaimer, the term of this patent is extended or adjusted under 35 U.S.C. 154(b) by 205 days.

(21) Appl. No.: 16/296,917

(22) Filed: Mar. 8, 2019

(65) Prior Publication Data

US 2019/0277519 A1    Sep. 12, 2019

Related U.S. Application Data

(60) Provisional application No. 62/641,109, filed on Mar. 9, 2018.

(51) Int. Cl.
  *F24F 6/04* (2006.01)
  *B01F 3/04* (2006.01)
  *F28C 3/08* (2006.01)

(52) U.S. Cl.
  CPC ............ *F24F 6/04* (2013.01); *B01F 3/04085* (2013.01); *F28C 3/08* (2013.01); *F24F 2006/046* (2013.01)

(58) Field of Classification Search
  CPC ............ B01F 3/04; B01F 3/04085; F24F 6/04; F28C 3/08
  See application file for complete search history.

(56) References Cited

U.S. PATENT DOCUMENTS

| D188,357 | S |  | 7/1960 | Klotz, Jr. |
| 3,147,319 | A | * | 9/1964 | Goettl ................... F24F 6/04 261/29 |
| D279,815 | S |  | 7/1985 | Yuen |
| D291,350 | S |  | 8/1987 | Sherman et al. |
| 5,168,722 | A |  | 12/1992 | Brock |
| D361,828 | S |  | 8/1995 | Chen |
| D403,757 | S |  | 1/1999 | Aketa et al. |
| D414,253 | S |  | 9/1999 | Kobayashi et al. |
| 6,101,831 | A |  | 8/2000 | Ciccone |
| 6,149,141 | A |  | 11/2000 | Birdsell et al. |

(Continued)

FOREIGN PATENT DOCUMENTS

CN           303331327 S     8/2015

*Primary Examiner* — Robert A Hopkins
(74) *Attorney, Agent, or Firm* — Brooks Kushman P.C.

(57) ABSTRACT

A media pad apparatus for a portable air cooler includes a frame having a top end and a media pad disposed within the frame. A top tray is provided on the top end of the frame and includes opposed walls, the opposed walls sloping downwardly from upper edges thereof to join at a common lower edge and create a generally V-shaped profile of the top tray. The top tray further includes a plurality of openings in the opposed walls spaced along a length of the top tray, wherein when fluid is provided to the top tray, the openings dispense the fluid through the top tray along the length thereof to wet the media pad in a spatially distributed manner. A portable air cooler with a media pad apparatus removably received therein is also disclosed.

12 Claims, 6 Drawing Sheets

(56) References Cited

U.S. PATENT DOCUMENTS

| | | |
|---|---|---|
| 6,223,548 B1 | 5/2001 | Calvert |
| 6,502,414 B1 | 1/2003 | Calvert |
| D493,215 S | 7/2004 | Asaoka et al. |
| 6,915,654 B2 | 7/2005 | Johnson |
| D532,889 S | 11/2006 | Shimizu |
| D543,614 S | 5/2007 | Chen |
| D553,725 S | 10/2007 | Shimizu |
| D559,973 S | 1/2008 | Rabito et al. |
| D594,960 S | 6/2009 | Orihara et al. |
| D606,645 S | 12/2009 | Orihara et al. |
| D626,206 S | 10/2010 | Orihara et al. |
| D710,487 S | 8/2014 | Lin |
| D726,892 S | 4/2015 | Chan |
| D733,273 S | 6/2015 | Jeon et al. |
| D733,860 S | 7/2015 | Konno et al. |
| D804,001 S | 11/2017 | Cartwright et al. |
| D827,115 S | 8/2018 | Petersen et al. |
| D850,593 S | 6/2019 | Petersen et al. |
| 2003/0094710 A1* | 5/2003 | Jouas ............... F24F 5/0035 261/97 |

\* cited by examiner

PORTABLE AIR COOLER AND MEDIA PAD APPARATUS FOR USE THEREWITH

CROSS-REFERENCE TO RELATED APPLICATIONS

This application claims the benefit of U.S. provisional application Ser. No. 62/641,109 filed Mar. 9, 2018, the disclosure of which is hereby incorporated in its entirety by reference herein.

TECHNICAL FIELD

Embodiments relate to a portable air cooler and a media pad apparatus for use with a portable air cooler.

BACKGROUND

Portable air coolers are an environmentally-friendly and cost-effective cooling option for a personal space. Portable air coolers use the natural process of water evaporation to cool incoming warm air and use a fan to expel cooled air. When warm air is drawn into a portable air cooler, it passes through a wet media pad. The warm air mixes with the wet media causing the water to evaporate and heat to be removed from the air. No compressor or ozone-depleting refrigerants are required, and portable air coolers also have the advantage of low power consumption.

Within a portable air cooler, traditional media pad frame designs include a multiple-piece frame with a horizontal, planar water tray at the upper end. In such a system, when the media pad becomes old and dirty, the user must take apart the frame in order to dispose of the media pad. The user then inserts a new media pad and is required to reassemble the frame.

SUMMARY

In one or more embodiments, a media pad apparatus for a portable air cooler includes a frame having a top end and a media pad disposed within the frame. A top tray is provided on the top end of the frame and includes opposed walls, the opposed walls sloping downwardly from upper edges thereof to join at a common lower edge and create a generally V-shaped profile of the top tray. The top tray further includes a plurality of openings in the opposed walls spaced along a length of the top tray, wherein when fluid is provided to the top tray, the openings dispense the fluid through the top tray along the length thereof to wet the media pad in a spatially distributed manner.

In one or more embodiments, a portable air cooler includes a housing including a top housing portion separable from a bottom housing portion. The top housing portion includes a cavity and the bottom housing portion includes a fluid reservoir, where a tank is removably received in the cavity for supplying fluid to the fluid reservoir. A disposable media pad apparatus is removably received within the housing, the media pad apparatus including a frame having a top end, a media pad disposed within the frame, and a top tray provided on the top end of the frame. A pump is disposed within the housing for pumping fluid from the fluid reservoir to the top tray, wherein fluid is dispensed through the top tray to wet the media pad. A fan is disposed within the housing for drawing air into the portable air cooler, pushing air through the media pad, and expelling cooled air from the portable air cooler.

In one or more embodiments, a portable air cooler includes a housing including a top housing portion separable from a bottom housing portion. The bottom housing portion includes a fluid reservoir, where a tank is removably received in the top housing portion for supplying fluid to the fluid reservoir. A media pad apparatus is removably received within the housing, the media pad apparatus including a frame having a top end and a media pad disposed within the frame. A top tray is provided on the top end of the frame and includes opposed walls, the opposed walls sloping downwardly from upper edges thereof to join at a common lower edge and create a generally V-shaped profile of the top tray. The top tray further includes a plurality of openings in the opposed walls spaced along a length of the top tray. A pump is disposed within the housing for pumping fluid from the fluid reservoir to the top tray, wherein the openings dispense the fluid through the top tray along the length thereof to wet the media pad in a spatially distributed manner. A fan is disposed within the housing for drawing air into the portable air cooler, pushing air through the media pad, and expelling cooled air from the portable air cooler.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
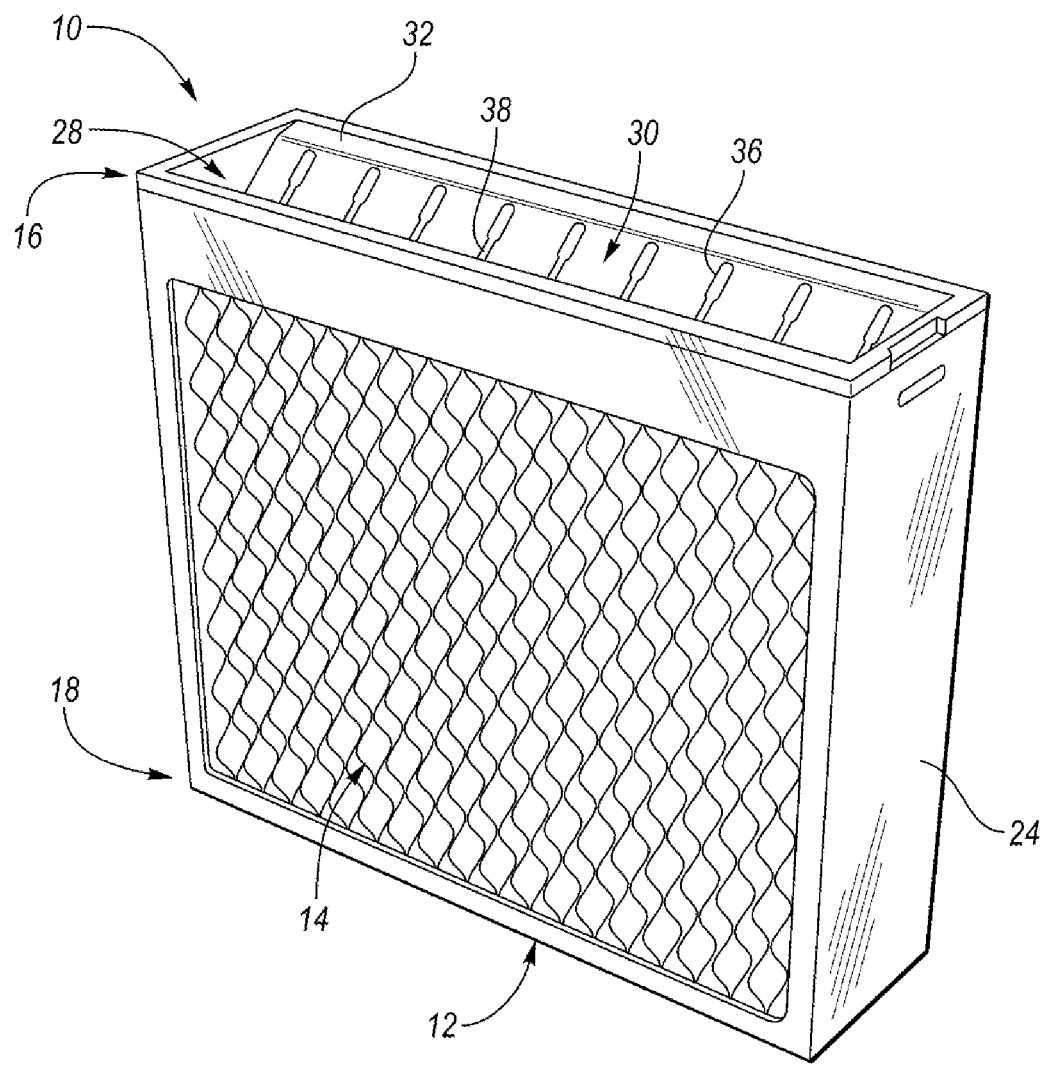
FIG. 1 is a front perspective view of a media pad apparatus according to an embodiment.
Figure 2:
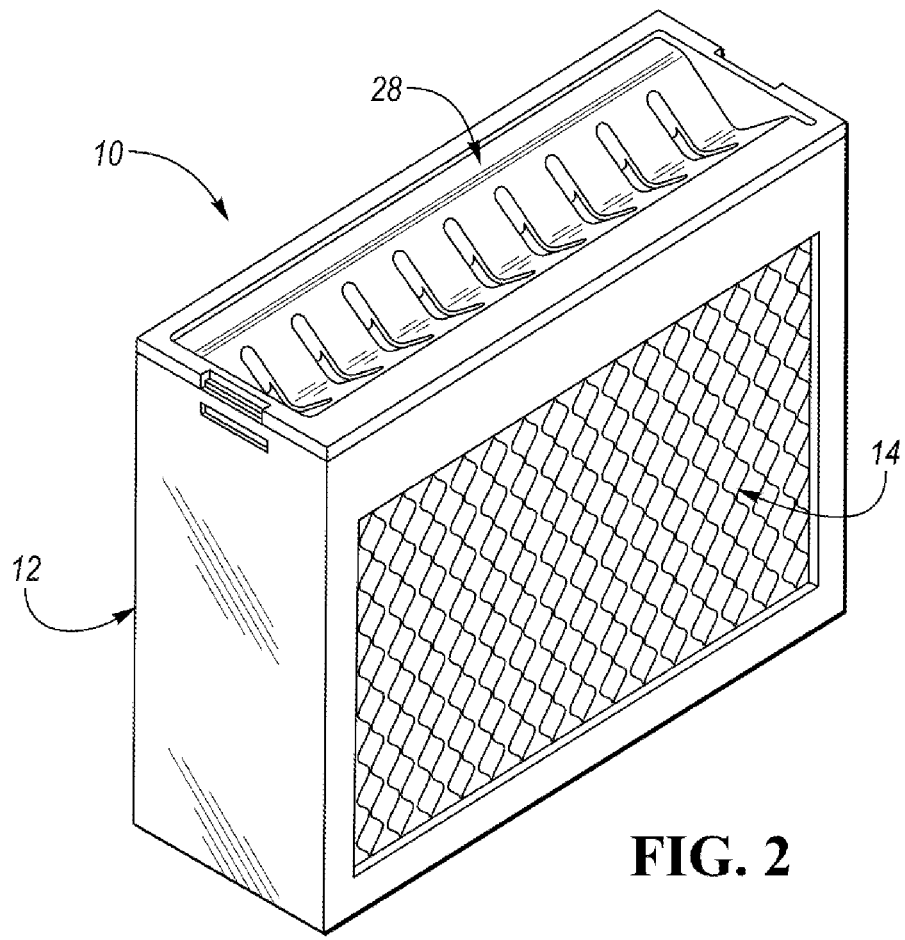
FIG. 2 is a top perspective view of the media pad apparatus.
Figure 3:
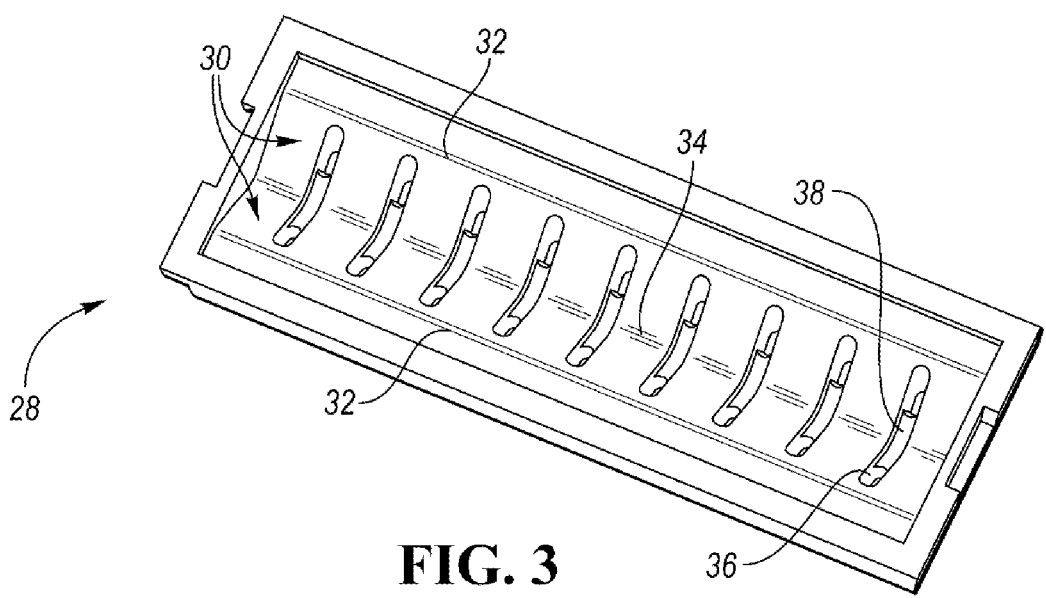
FIG. 3 illustrates an exterior of the top tray of the media pad apparatus according to an embodiment.
Figure 4:
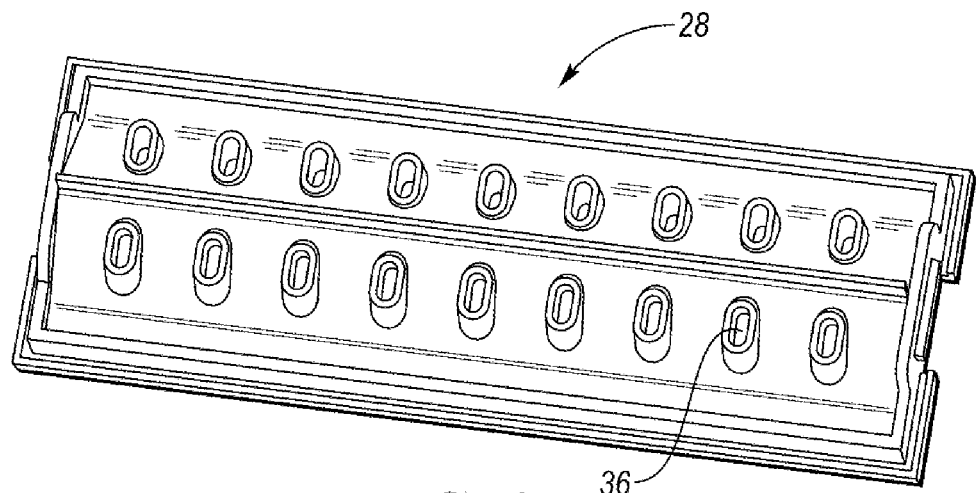
FIG. 4 shows an interior of the top tray of the media pad apparatus.
Figure 5:
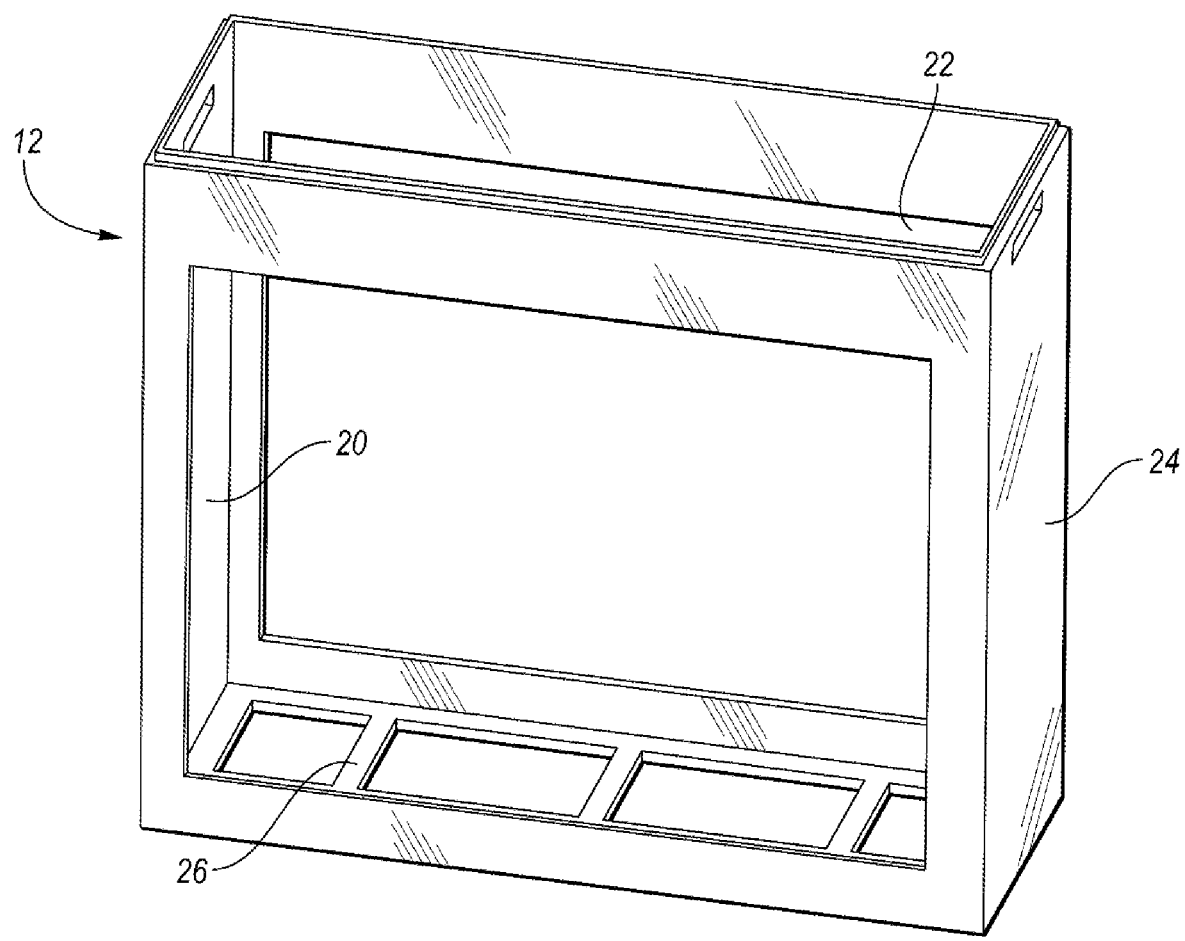
FIG. 5 is a perspective view of the frame of the media pad apparatus.
Figure 6:
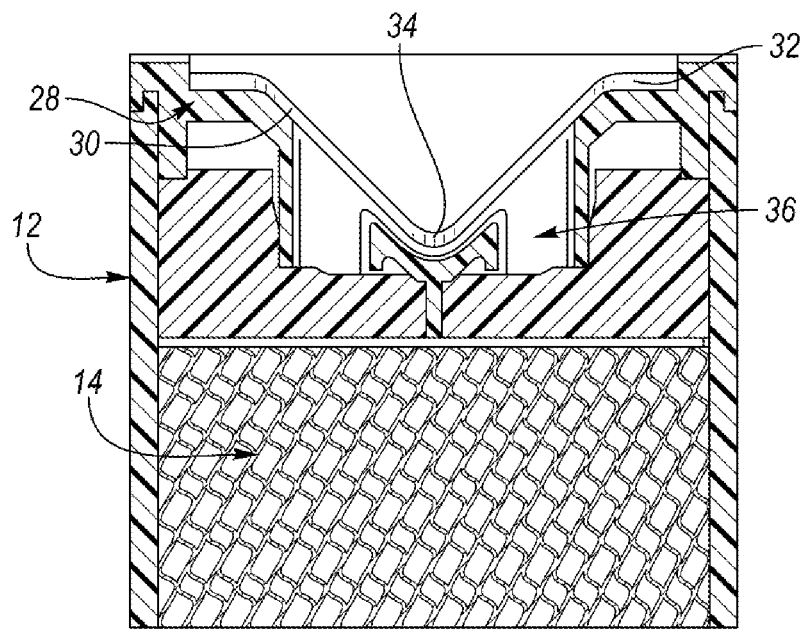
FIG. 6 is a partial cross-sectional view of the media pad apparatus.

With reference to FIGS. 1-6, a media pad apparatus 10 according to an embodiment is shown. The media pad apparatus 10 includes a frame 12 and a media pad 14 disposed therein. The frame 12 may be generally rectangular and has a top end 16 and a bottom end 18. The frame 12 includes a front opening 20 and an opposed rear opening 22 through which air can be blown through the media pad 14, as described further below. In one non-limiting embodiment, the frame 12 includes side panels 24 which may be solid. As best shown in FIG. 5, spaced struts 26 may be provided along the bottom end 18 to provide strength and stability to the frame 12 and support the media pad 14 therewithin, while also allowing water to drain from the media pad 14 through the frame 12. The frame 12 may be constructed from a plastic material, although other suitable materials may alternatively be utilized. The media pad 14 may be constructed from any material suitable for providing its evaporative and cooling function as is known in the art.

The frame 12 is designed to provide a steady flow of a fluid (e.g. water) downward onto the media pad 14, acting as an effective fluid distribution system for wetting the media pad 14. Specifically, the media pad apparatus 10 includes a top tray 28 provided on the top end 16 of the frame 12, the top tray 28 having a generally V-shaped or trough design which includes opposed walls 30 which slope downwardly from upper edges 32 thereof to join at a common lower edge 34 and create the V-shaped profile. The top tray 28 further includes a plurality of openings 36 in the walls 30 spaced along a length of the top tray 28. In addition, recessed channels 38 may be spaced along the length of the top tray 28 and spanning the opposed walls 30 on either side of the lower edge 34, wherein the openings 36 are provided at an uppermost end of each channel 38 adjacent to the upper edges 32 of the walls 30.

When fluid is provided to the top tray 28, the top tray 28 fills with fluid such that fluid is equally distributed along the top tray 28 may flow into each channel 38. Once the fluid level is high enough in the top tray 28, fluid enters the openings 36 and is dispensed through the top tray 28 by gravity onto the media pad 14. The position of the openings 36 along the length of the top tray 28 allows fluid droplets to fall downward to wet the media pad 14 in a spatially distributed manner at multiple areas along the length of the media pad 14 and not only in the middle of the media pad 14. In this way, the design of the top tray 28 functions to control the flow of the fluid into and through the media pad 14, such that fluid saturates all portions of the media pad 14 in order to provide efficient cooling when air is pushed through the media pad 14.

As such, unlike previous designs, the media pad apparatus 10 disclosed herein allows fluid to fill the top tray 28 and be dispensed downward through the openings 36 to the media pad 14 in a spatially distributed, approximately equal flow along the length of the top tray 28 and the media pad 14. In addition, the entire media pad apparatus 10, including the frame 12 and enclosed media pad 14, is disposable such that the user is not required to remove the media pad 14 from the frame 12 during replacement.

Figure 7:
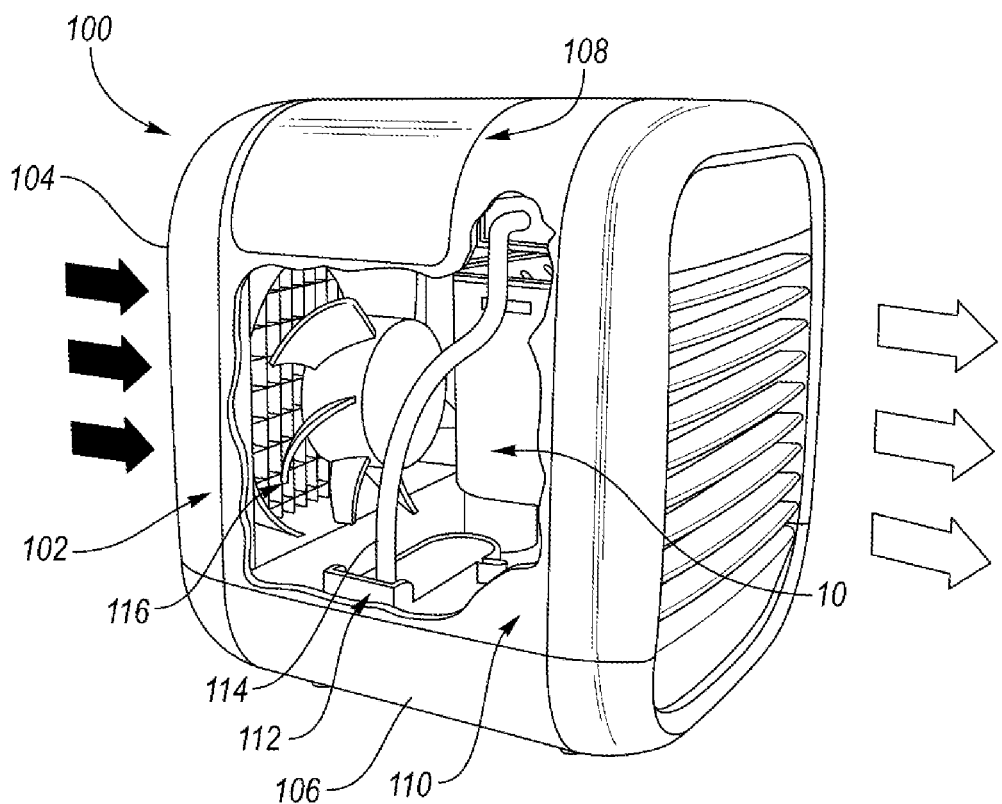
FIG. 7 is a schematic illustration of the operation of a portable air cooler in which the media pad apparatus may be utilized.

Turning now to FIG. 7, the operation of a portable air cooler 100 which may utilize the media pad apparatus 10 is illustrated. The portable air cooler 100 includes a housing 102 which includes a top housing portion 104 separable from a bottom housing portion 106. A removable and refillable tank 108 is received on the top housing portion 104, and the bottom housing portion 106 includes a fluid reservoir 110. A pump 112 is disposed within the housing 102 for pumping fluid from the fluid reservoir 110 to the top tray 28 of the media pad apparatus 10, wherein a hose 114 may be connected to the pump 112 for delivering fluid to the top tray 28. Fluid is dispensed through the top tray 28 to wet the media pad 14 as described above. As shown, air is drawn into the portable air cooler 100 with a fan 116, the air is pushed through the wet media pad 14, and cool air is expelled from the portable air cooler 100. The portable air cooler 100 may be powered by a power cord (not shown) plugged into a standard electrical outlet, or alternatively could be battery-powered.

Figure 8:
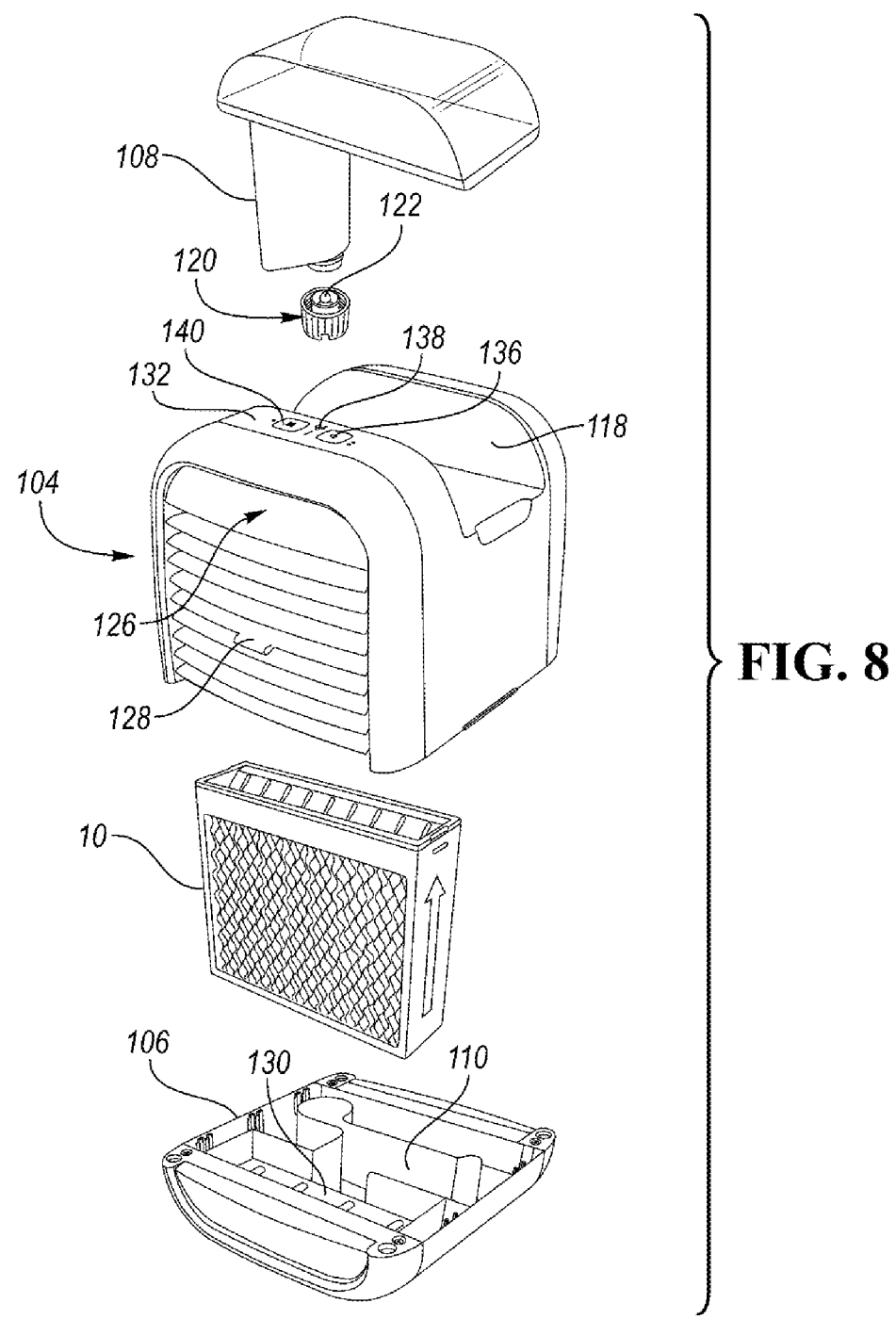
FIG. 8 is an exploded view of a portable air cooler illustrating the tank, top housing portion, media pad apparatus, and bottom housing portion according to an embodiment.
Figure 9:
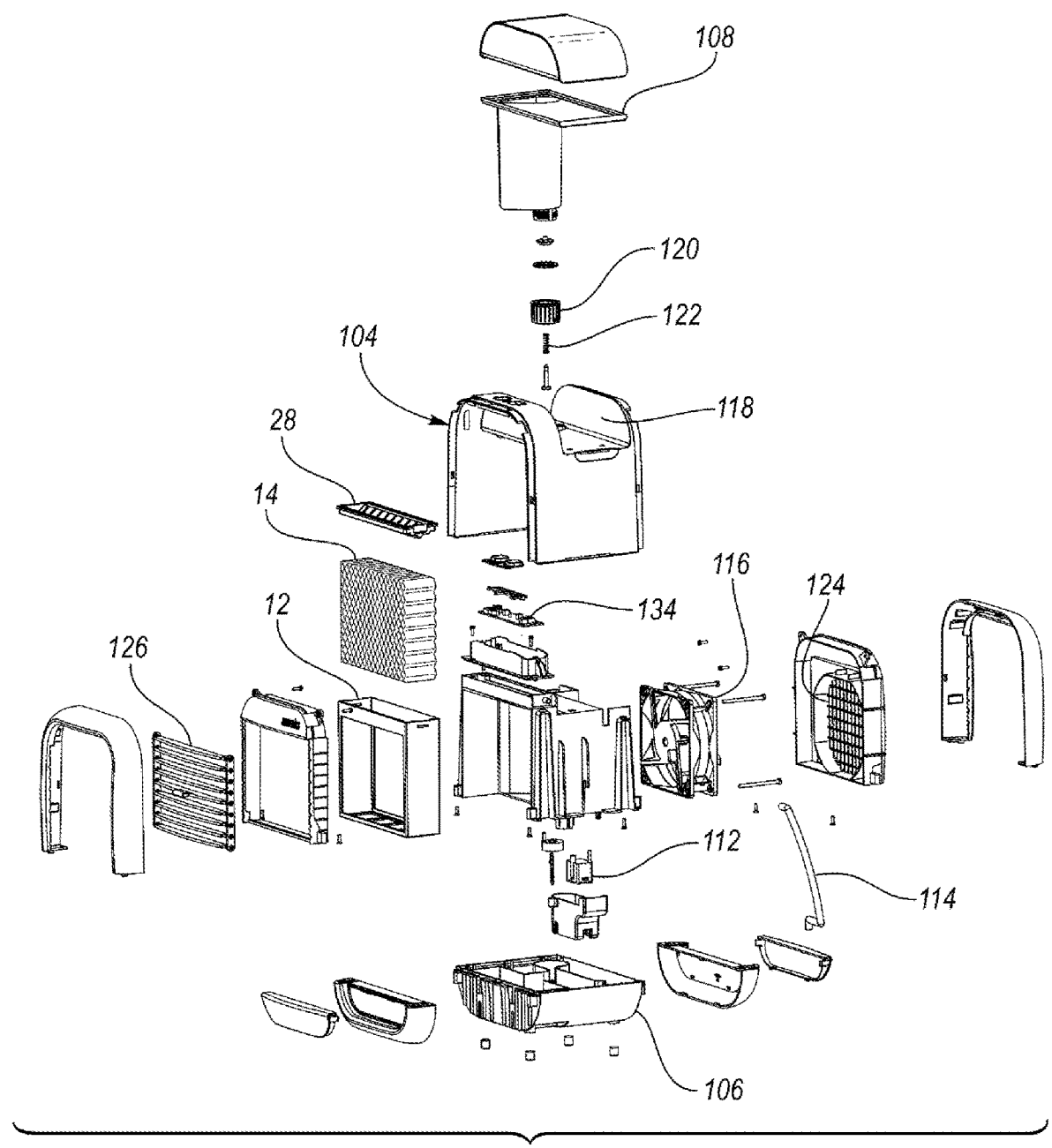
FIG. 9 is an exploded view of a portable air cooler including the media pad apparatus.

With reference to FIGS. 8 and 9, exploded views of the portable air cooler 100 are illustrated. As shown, the top housing portion 104 may include a cavity 118 for removably receiving the tank 108. In one embodiment, the tank 108 extends through the housing 102 for supplying fluid to the fluid reservoir 110. The tank 108 includes a cap 120 having a check valve 122, wherein engagement of the check valve 122 with the bottom housing portion 106 allows fluid from the tank 108 to be dispensed into the fluid reservoir 110. To fill the tank 108, the tank 108 may be removed from the top housing portion 104, turned upside down, and the cap 120 removed. After filling, the cap 120 is replaced and placed back into the cavity 118 such that the check valve 122 engages the bottom housing portion 106 to replenish fluid in the fluid reservoir 110.

The top housing portion 104 includes a rear grille 124 through which air is drawn into the portable air cooler 100 and a front grille 126 through which cooled air is expelled from the portable air cooler 100. In one embodiment, the front grille 126 may include adjustable louvers 128 for directing the flow of cooled air as desired. The bottom housing portion 106 includes a compartment 130 for removably receiving the bottom end 18 of the media pad apparatus 10. The compartment 130 is in fluid communication with the fluid reservoir 110, such that fluid draining from the media pad apparatus 10 can be returned to the fluid reservoir 110. The top housing portion 104 and bottom housing portion 106 are separable, such as for cleaning the fluid reservoir 110 and for access to the removable media pad apparatus 10. The entire media pad apparatus 10 can be removed for cleaning, such as by rinsing with clean water, or for replacement. For instance, the media pad apparatus 10 may be replaced seasonally or after a predetermined length of usage. In one non-limiting embodiment, it may be recommended to replace the media pad apparatus 10 after 540 hours of use for optimal performance.

A control panel 132 is provided on the top housing portion 104 for user input, where a controller 134 is provided in electrical communication with the control panel 132, the pump 112, and the fan 116. The control panel 132 may include a power button 136 having various functions as described below. The control panel 132 may also include indicator lights 138 for indicating a low fluid level in the fluid reservoir 110 and for indicating a need to replace the media pad apparatus 10 after a certain number of use hours is met or exceeded. A media reset button 140 may be provided to reset the use hours when the media pad apparatus 10 is replaced.

The fan 116 has a plurality of speeds that are selectable via the control panel 132. In one embodiment, when the portable air cooler 100 is powered on by pressing the power button 136, the default speed of the fan 116 will be low. To increase the speed of the fan 116 to medium, the power button 136 can be pressed a second time. If the power button 136 is pressed a third time, the speed of the fan 116 will be increased to high. Indicator lights 138 can be used to identify the different speeds of the fan 116. If the power button 136 is pressed a fourth time, the portable air cooler 100 will be turned off.

The media pad apparatus 10 and the portable air cooler 100 described herein are capable of reducing the temperature of the air (such as, but not limited to, approximately 12 degrees F.) and provide a relaxing cooling effect to an area several feet around the portable air cooler 100. The portable air cooler 100 and included media pad apparatus 10 may be used in various environments, such as in the office, a dorm room, bedside, in the kitchen, or anywhere that cooling of indoor personal space is desired. The portable air cooler 100 and media pad apparatus 10 provide natural and efficient cooling, require low power consumption, do not need a compressor, and do not use any ozone-depleting refrigerants. Furthermore, due to the design of the media pad apparatus 10, fluid is dispensed onto and through the media pad 14 in a spatially distributed manner and the entire media pad apparatus 10, including the frame 12 and enclosed media pad 14, is disposable and easily replaceable.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A portable air cooler, comprising:
   a housing including a top housing portion separable from a bottom housing portion, the top housing portion including a cavity, the bottom housing portion including a fluid reservoir;
   a tank removably received in the cavity for supplying fluid to the fluid reservoir;
   a disposable media pad apparatus removably received within the housing, the media pad apparatus including a frame having a top end, a media pad disposed within the frame, and a top tray provided on the top end of the frame;
   a pump disposed within the housing for pumping fluid from the fluid reservoir to the top tray, wherein fluid is dispensed through the top tray to wet the media pad; and
   a fan disposed within the housing for drawing air into the portable air cooler, pushing air through the media pad, and expelling cooled air from the portable air cooler.

2. The portable air cooler of claim 1, wherein the tank includes a cap having a check valve, wherein engagement of the check valve with the bottom housing portion allows fluid from the tank to be dispensed into the fluid reservoir.

3. The portable air cooler of claim 1, further comprising a hose connected to the pump for delivering fluid to the top tray.

4. The portable air cooler of claim 1, wherein the bottom housing portion includes a compartment for removably receiving a bottom end of the media pad apparatus.

5. The portable air cooler of claim 4, wherein the compartment is in fluid communication with the fluid reservoir.

6. The portable air cooler of claim 1, wherein the top tray includes opposed walls sloping downwardly from upper edges thereof to join at a common lower edge and create a generally V-shaped profile of the top tray, the top tray including a plurality of openings in the opposed walls spaced along a length of the top tray.

7. The portable air cooler of claim 1, wherein the top housing portion includes a rear grille through which air is drawn into the portable air cooler and a front grille through which cooled air is expelled from the portable air cooler.

8. The portable air cooler of claim 1, further comprising a control panel provided on the housing.

9. The portable air cooler of claim 8, further comprising a controller in electrical communication with the control panel, the pump, and the fan.

10. The portable air cooler of claim 8, wherein the fan has a plurality of speeds selectable via the control panel.

11. The portable air cooler of claim 8, wherein the control panel includes indicator lights for indicating a low fluid level in the fluid reservoir and for indicating a need to replace the media pad apparatus.

12. A portable air cooler, comprising:
   a housing including a top housing portion separable from a bottom housing portion, the bottom housing portion including a fluid reservoir;
   a tank removably received in the top housing portion for supplying fluid to the fluid reservoir;
   a media pad apparatus removably received within the housing, the media pad apparatus including a frame having a top end, a media pad disposed within the frame, and a top tray provided on the top end of the frame and including opposed walls, the opposed walls sloping downwardly from upper edges thereof to join at a common lower edge and create a generally V-shaped profile of the top tray, the top tray including a plurality of openings in the opposed walls spaced along a length of the top tray;
   a pump disposed within the housing for pumping fluid from the fluid reservoir to the top tray, wherein the openings dispense the fluid through the top tray along the length thereof to wet the media pad in a spatially distributed manner; and
   a fan disposed within the housing for drawing air into the portable air cooler, pushing air through the media pad, and expelling cooled air from the portable air cooler.

* * * * *